US012112659B2

(12) United States Patent
Fuehrer et al.

(10) Patent No.: US 12,112,659 B2
(45) Date of Patent: Oct. 8, 2024

(54) PRODUCT SAMPLE DISPLAY SYSTEM AND METHOD

(71) Applicants: Jeffrey R. Fuehrer, Danville, IN (US); Reece Fuehrer, Danville, IN (US); Jeff Reynolds, Danville, IN (US)

(72) Inventors: Jeffrey R. Fuehrer, Danville, IN (US); Reece Fuehrer, Danville, IN (US); Jeff Reynolds, Danville, IN (US)

(73) Assignee: R&R Products, Inc., Danville, IN (US)

( * ) Notice: Subject to any disclaimer, the term of this patent is extended or adjusted under 35 U.S.C. 154(b) by 0 days.

(21) Appl. No.: 17/835,333

(22) Filed: Jun. 8, 2022

(65) Prior Publication Data

US 2024/0135839 A1 Apr. 25, 2024
US 2024/0233582 A9 Jul. 11, 2024

Related U.S. Application Data

(60) Provisional application No. 63/321,789, filed on Mar. 21, 2022, provisional application No. 63/236,793, filed on Aug. 25, 2021, provisional application No. 63/208,802, filed on Jun. 9, 2021.

(51) Int. Cl.
*G09F 5/00* (2006.01)

(52) U.S. Cl.
CPC .................................... *G09F 5/00* (2013.01)

(58) Field of Classification Search
CPC ............ G09F 5/00; A47F 5/00; A47F 5/0087
See application file for complete search history.

(56) References Cited

U.S. PATENT DOCUMENTS

| | | | | | |
|---|---|---|---|---|---|
| 452,957 | A * | 5/1891 | Staunton | G09F 11/02 | 40/497 |
| 928,292 | A * | 7/1909 | Walsh | A47G 25/0685 | 211/96 |
| 1,049,886 | A * | 1/1913 | Manson | G09F 11/02 | 40/497 |
| 1,597,688 | A * | 8/1926 | Moskovitz | A47F 5/00 | 211/4 |
| 2,879,898 | A | 3/1959 | Best | | |
| 3,924,749 | A * | 12/1975 | Weston | A47F 7/0246 | 211/169 |
| 4,757,906 | A | 7/1988 | Ovitz | | |
| 4,881,336 | A * | 11/1989 | Braverman | G09F 1/12 | 40/530 |
| 5,785,184 | A * | 7/1998 | Metselaar | E05B 69/006 | 70/59 |
| 7,481,323 | B2 * | 1/2009 | Fisher | B05B 13/0285 | 211/196 |
| 2001/0008223 | A1 * | 7/2001 | Accatino | A47F 5/132 | 211/169 |
| 2003/0047528 | A1 | 3/2003 | Stein | | |

(Continued)

*Primary Examiner* — Gary C Hoge
(74) *Attorney, Agent, or Firm* — Overhauser Law Offices, LLC

(57) ABSTRACT

A product sample display structure holding multiple vertical shafts, each vertical shaft supporting a wing support bracket that may be positioned at a selected vertical location on the shaft. Vertically adjusting the wing support brackets allows the structure to hold wings of varying heights or from different manufacturers. A display board clamp includes a block having perpendicular slots offset from the midline of the blocks.

23 Claims, 13 Drawing Sheets

(56) References Cited

U.S. PATENT DOCUMENTS

| | | | | |
|---|---|---|---|---|
| 2006/0131249 | A1* | 6/2006 | Kostigian | A47F 7/166 211/189 |
| 2007/0034585 | A1* | 2/2007 | Fisher | B05B 13/0285 211/189 |
| 2007/0262039 | A1* | 11/2007 | Biser | A47F 7/163 211/169 |
| 2012/0280093 | A1* | 11/2012 | Alicea | A47F 7/163 40/606.01 |
| 2018/0008063 | A1* | 1/2018 | Roan | G09F 15/00 |

* cited by examiner

PRODUCT SAMPLE DISPLAY SYSTEM AND METHOD

CROSS REFERENCE TO RELATED APPLICATIONS

This application claims the benefit of US Provisional Application Nos. 63/208,802 filed Jun. 9, 2021, 63/236,793 filed Aug. 25, 2021 and 63/321,789 filed Mar. 21, 2022, the contents of each of which are hereby incorporated by reference in their entireties.

FIELD OF THE INVENTION

The present invention relates to a product sample display system and method.

BACKGROUND

Many types of building materials and information such as carpet, wood flooring, laminate, vinyl, ceramic, tiles, rugs, other floor covering products, wall-paper, paneling, paint, cabinet doors, shingles and roofing products, as well as associated marketing information, pricing, etc., are displayed on loose samples or on page or board-type displays or rack and wing displays. These displays can be made of, for example, card stock, wrapped card stock, hardboard, styrene, formed or molded plastic products, wood, metal, or other materials. One or more wings holding such samples are typically attached to a display fixture or rack, including but not limited to, floor-standing or wall-mounted support devices using a short pin-long pin mounting method, rods, hinges, or other attachment means to secure the wings to the frame. The display device usually has a single array of wings, or one row of wings to a side, although in some instances, multi-tiered arrays of small wings are used.

Typically, all of the wings on the display device are approximately the same size and shape, often because the samples are supplied by a specific manufacturer that makes its wings and samples the same size. Usually, the long dimension of the wing forms the spine which is pivotally mounted to the display device. FIGS. 1 and 2 show representative prior art display systems. As is evident by these FIGS., existing display systems limit the ability to display material or information on underlying wings of an array, since overlying wings of the array, typically being of about the same size and shape as the underlying wings, cover substantially all of the surface area of the underlying wings. Although a viewer typically can pivot the overlying wings out of the way to view an underlying wing, many consumers are reluctant to take time and effort to flip through an entire array to view the samples on every wing in a display. Moreover, many "impulse" buyers will not even bother to approach a display if a sample they might be interested in is hidden from view by overlying wings bearing material that they are not interested in.

Further, moving multiple wings in a display from one side to the other to display a selected wing can be difficult, because wings can be heavy and it may be necessary to move multiple wings. Existing displays also require a large and heavy base and structure because the wings themselves are heavy, the displays must be resistant to tipping over, and the displays must be able to withstand the force of the wings being pushed from one side of the display to the other. For this reason, existing display systems require a large of amount space, and in retail space, sufficient square footage is not economically available.

As noted, display systems are typically provided by product manufacturers, who also supply the wings or boards on which sample products are displayed. However, each display system usually holds only the wings or boards from the manufacturer that supplied the display system. This forces a retailer to display only models and styles of that manufacturer, even the low-volume styles that the retailer may not even stock. In addition, manufacturers regularly discontinue particular models or styles without replacing it when a new model or style. These samples must be removed from the display system, which results in unused capacity of the display system. While a retailer may prefer to populate the unused space with products of other manufacturers, the display system usually only accepts wings or displays of the manufacturer that supplied the display system. This results in suboptimal utilization of the display system by the retailer. It would be preferable to provide a universal display system that can accept wings or displays from any manufacturer, regardless of size of the wings or displays or how they are mounted onto the manufacturer-supplied display system. Such a system would allow a retailer to display only the wings or displays that provide the best return on investment for the retailer.

There have been multiple attempts to solve the display issues for samples. For example, U.S. Pat. No. 2,879,898 discloses a floor mounted rug display rack that includes a downwardly sloping support to allow rugs of various sizes to be displayed using one display device. Another purpose of the '898 Patent is to conserve floor space with the downwardly sloping design. However, a user would still need to lift each sample to fully view the sample underneath.

U.S. Pat. No. 4,757,906 discloses a display rack for flooring samples whereby a wire rack is used to create horizontal slots to display a sample folded into a u-shape between two of the slots. However, this requires the sample to be made from a bendable material, which is not the case for many building material samples. It also only allows the viewer to see a small portion of the whole sample.

Additionally, U.S. Patent Application No. 2003/0047528 discloses a display rack with multiple board sizes that allows dealers to use overlapping displays in which the top layer is the smallest and each subsequent layer is larger and extends past the first display. While this may seem to solve some of the issues in viewing multiple wings, the user still has to flip through each wing and will eventually have to move all of the wings back to their open position which can be heavy and cumbersome.

While the options in the prior art attempt to solve a few of the issues with current display product they have multiple limitations and none user-friendly or space-saving.

SUMMARY OF THE INVENTION

One embodiment of the invention provides a display frame comprising multiple vertical shafts and a base; each vertical shaft having a wing support bracket that may be positioned at a selected vertical location on the shaft. The wing support brackets may be at the top, at the bottom, or at the top and bottom. The wing support brackets are vertically adjusted allow any sized display wing to be fitted into the display frame. There can also be multiple wing support brackets on a single shaft. These improvements allow wings of different heights, for instance from different manufacturers, to be held on the same display frame. They further allow groupings of wings by type (e.g., type of floor), subtype (e.g., material), color, manufacturer, etc.

Another embodiment of the present invention provides a display frame with a base and parallel vertical shafts in a curved configuration with wing stops. The wing stops limit the angle, from neutral, that each wing frame can pivot. The curved configuration may be a full or partial oval or circle with the base and support rings being full or cut to allow reconfiguration as desired to full, half, or quarter barrel configurations. The ability to use partial oval or circle base and support rings allows the display frame to be positioned around and/or adjacent to a building support column to support the display structure. These improvements allow the display frame to hold more wings in a configuration that takes up less square footage. Further, the number of adjacent wings that are moved when an adjacent pair of wings is opened is limited, which allows multiple adjacent wings to be viewed by different people at different parts of the display frame at the same time. The curved configuration allows the user to use less force to move the wings since the curved arrangement limits the number of wings that must be moved simultaneously. Additionally, there is improved viewability since the adjacent wings in a non-linear display may be opened to a greater angle than in a typical linear display. In the present invention, the wings may be opened approximately 100°-150°. Finally, there is increased stability when attaching the display frame to an existing building column.

A further embodiment includes a mechanism to bias the wing frames of a display system towards a neutral position. For this embodiment, a display frame holding multiple adjacent wings includes a mechanism to bias the wing frames toward the neutral position if the wing frame is close to neutral position (e.g. ≤15°) or toward the open position if the wing frame is close to a not near neutral position (e.g. more than 15°). This feature eliminates the need for a salesperson to manually move the wing frames to a neutral position after a consumer has viewed a display. Further, no wing will abut an adjacent wing (when all wings are in the neutral position) so some part of each wing is viewable without having to move any wing. Finally, this allows for an increased aesthetic appearance.

A display system of the present invention may be manufactured with a central hole or space to be attached to a building support column with display wings on opposing sides. In this embodiment, at least two opposing sides would be equipped with wing support brackets. This allows for a smaller base with a lighter support structure that is sturdy and not likely to tip over.

Using a display system with battery-operated overhead lights can also help improve a display system. The system may be provided with multiple groups of adjacent wings having a common feature or each individual system would have a common feature. For example, the common features could include manufacturer, flooring type, flooring sub-type, color, etc. The user could have multiple sets of battery-operated lights on the same display system with each set shining a different color of light on each of the groupings. This would make it easier to locate flooring samples having a desired feature. It also allows displays to be located where a wired power source is not available or easily accessible.

Integrating a display system with QR codes for each display or wing integrated with an information provision system allows for easier shopping for the customer and eliminates a lot of unnecessary work for the seller. For example, each wing may have a barrel (display) identifier, a wing identifier, sample identifier, and a QR code. A database is provided that associates the QR code with information about the product displayed that is associated with the barrel identifier, wing identifier, and sample identifier. Some of the information that may be provided includes price, availability status, backorder status, discontinued status, and similar products. This database would be available via a hardware and software system that is operable to display the information associated with a scanned-in QR code. The hardware and software system may also be able to accept quoting and ordering information and generate pricing information for the product quoted or ordered. The hardware may be a smartphone, tablet, or any other hardware that is equipped with QR reader capabilities.

The system may also include a database having identifiers for multiple store locations. The system further includes a means for receiving geolocation information from the hardware used to input quoting or ordering information and a means for quoting pricing information based on the received geolocation information. These improvements eliminate the need to manually update pricing on displays, allow a consumer to receive information and quotes without the assistance of a salesperson, collects information about each consumer that scans a QR code, and allows deployment of the system in multiple locations.

Another aspect of the present invention is a system that biases the wings toward a neutral position. A display structure, not necessarily in a curved configuration, holding multiple pivotable wings may be made whereby each wing is positionable in a neutral position in which the wing does not abut or contact any adjacent wing. The structure would further include a means biasing each wing toward its neutral position. This permits easier viewing of a portion of each wing because adjacent wings are not abutting, which allows viewing of each wing. It also reduces the amount of force required to fully open and display a desired wing when all wings are in their neutral position because adjacent wings will not need to be moved as a user begins to move the desired wing to a displayed position.

A further option includes the use of a display frame holding a plurality of pivotable display wing frames with a stop means connected to the wing frame for each wing operable to limit the extent to which each wing may pivot. This reduces the amount of force required to fully open and display a desired wing because the adjacent wings can only be opened to a limited extent. This means the adjacent wings cannot put their full force on the desired wing making it lighter and easier to open. The stop means may include the point at which the wing frame hits the edge of the wing support bracket, thereby not allowing the frame to rotate any further.

Another embodiment of the present invention includes a non-neutral position holding mechanism such as a magnet, detent, or some other suitable means to hold the wing frames in a non-neutral position. The holding mechanism allows the wing to be kept in its displayed position without the user holding it open. This may be accomplished with a magnet affixed to the wing support bracket and the wing frame being comprised of a material attracted by the magnet. Another option is using a small detent in the wing support bracket with a small bulb on the wing frame that fits within the detent and is removable with a small amount of force. This improves the viewing of the wings because they will remain open and not be affected by gravity or inadvertent movement of the wing frame.

A further embodiment of the present invention may be manufactured using vertical shafts. Each vertical shaft may have a plurality of holes, or vertical wing adjustments, along its length at set intervals, such as a hole every ¾" along the length. A wing support bracket may placed over the vertical shaft and can be adjustably held in place against the vertical shaft. One option for holding the wing support bracket in place is by sliding a pin through a hole in the wing support bracket and the vertical shaft. Further, the wing support bracket may rest on a pin placed through a hole in the vertical shaft. The wing support bracket may also have wing stops that limit the extent to which the wings may open and/or magnets on the sides of the wing support bracket that hold the wing frame open.

A further embodiment comprises wing support brackets that have notches to allow them to mounted on or removed from threaded shafts at any desired vertical location. Nuts and washers may be mounted on a threaded shaft and moved to the vertical location where it is desired to mount a wing support bracket. Notches in the wing support bracket may be fitted around threaded shaft, and then secured to the shaft with the nuts and washers. Separate holds or pegs in the wing support bracket allow the wings or display of different heights to be mounted on the display system.

A further embodiment comprises a clamp having two arms with block on each arm. The combination of the clamp arms and blocks securely hold a wing or display to the clamp. The use of the clamp allows the system to hold a wing or display of virtually any manufacturer. In one embodiment, the block is provided with two perpendicular slots, each of which is offset from the midlines of the block by a different amount. By selecting the orientation of the block when placing it over an arm of clamp, it is possible to select the size of the gap between the blocks. This allows the clamp to securely hold a wing or display board regardless of the thickness of the wing or display board. This is desirable because the thickness of wings and display boards vary greatly between different manufacturers, and the ability to accommodate different widths allows virtually any wing or display board to be mounted on the display system.

DETAILED DESCRIPTION

Figure 3:
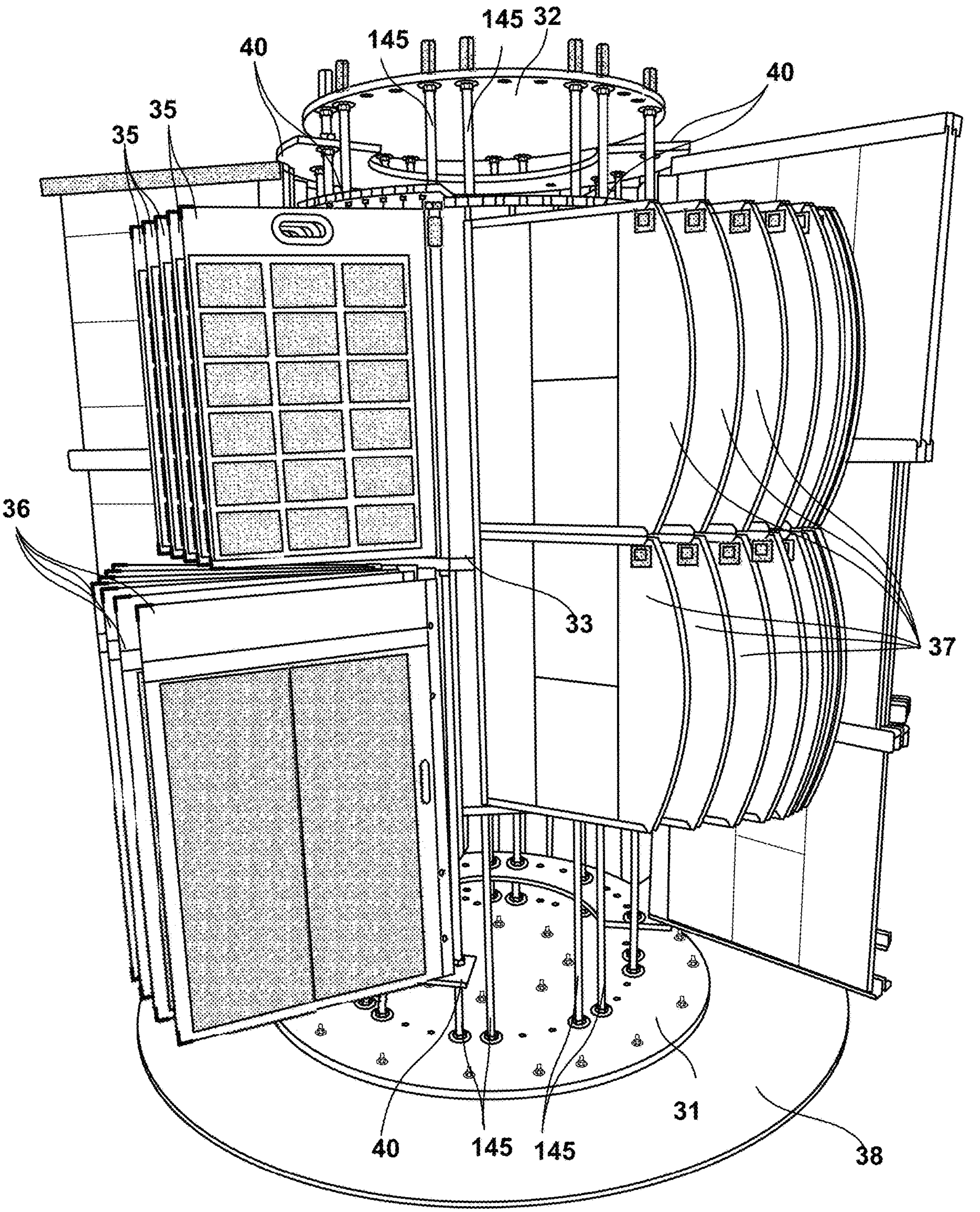
FIG. 3 shows a display system with multiple vertical shafts in a circular orientation and height-adjustable wing support brackets on different vertical shafts to display wings of varying heights.

As shown in FIG. 3, disclosed is a display frame comprising multiple vertical shafts 145 that extend between a bottom support base 31, a top support 32, and an optional central support 33. In one embodiment, the vertical shafts are arranged in a circular or arcuate orientation.

Figure 1:
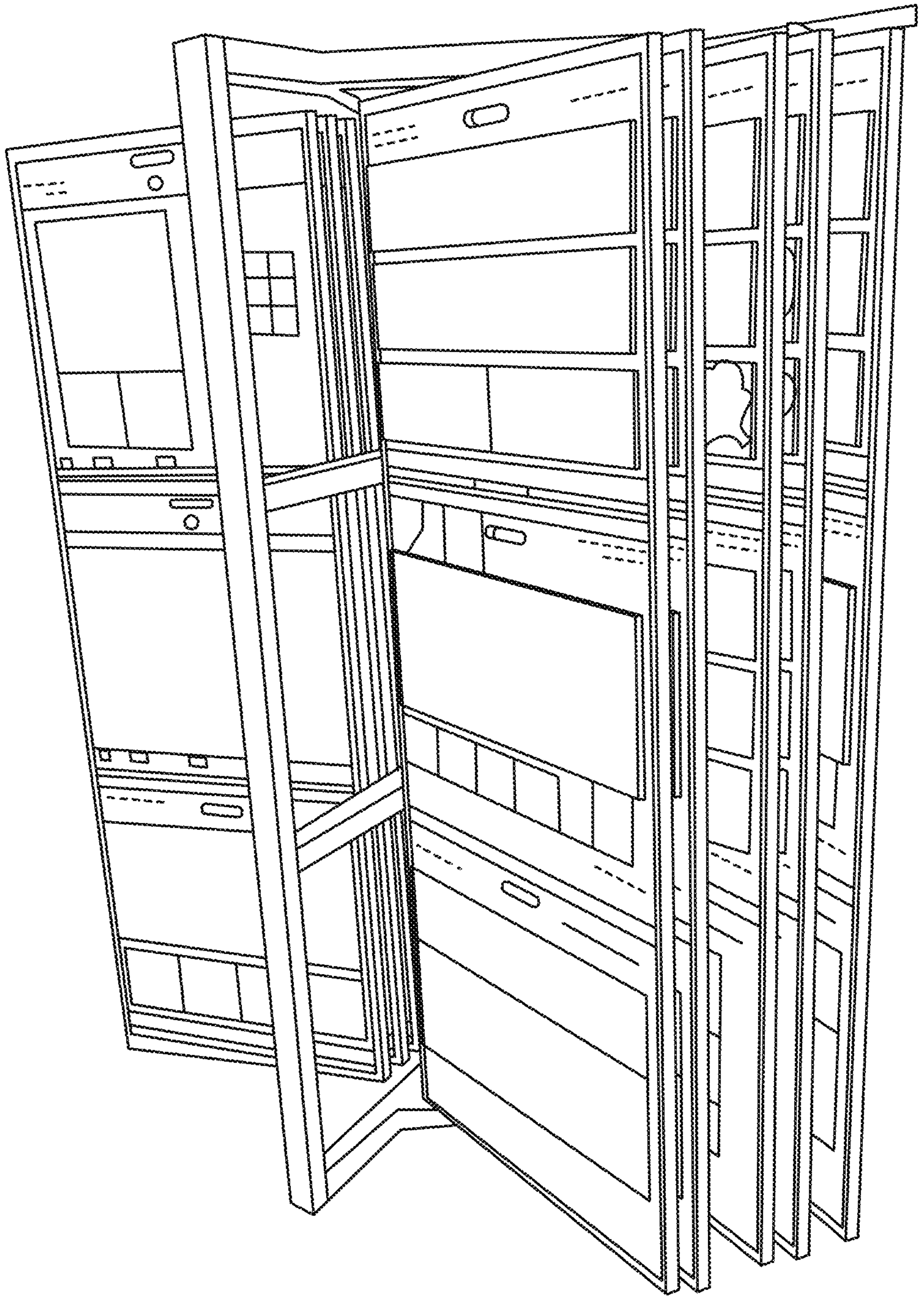
FIG. 1 (Prior Art)
FIG. 1 shows a representative prior art display system holding triple-height display boards in which six display boards (three on each side) are on each wing. Thus, pivoting one wing moves six display boards.
Figure 2:
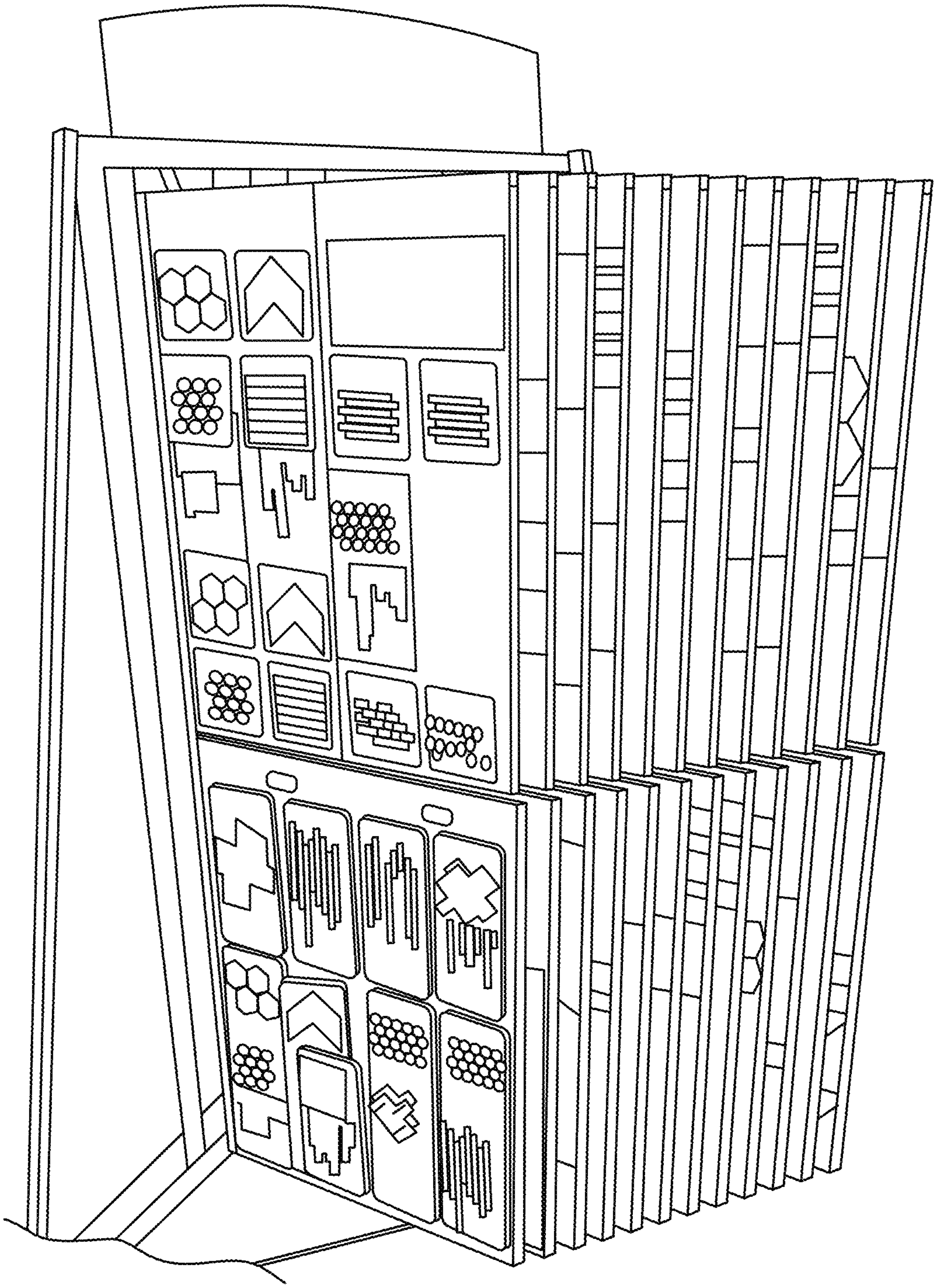
FIG. 2 (Prior Art)
FIG. 2 shows a representative prior art display system holding upper and lower sets of display boards in which two display boards (one on each side) are on each wing. An upper wing may pivot independently the wing below it.

Wing support brackets 40 are mounted on the shafts, and can be positioned at any vertical point along the shafts 145. This allows the system to hold display wings 35, 36, 37 of different heights, which may be from different manufacturers. This allows the display system to be much more versatile than existing systems which typically only accommodate display wings that are the same height, as shown in FIGS. 1 and 2.

The wing support brackets 40 may be at the top, at the bottom, or at the top and bottom of the wing frames. The wing support brackets are vertically positioned on threaded shafts having nuts to set the height. The top 32, bottom 31 and central 33 supports may also serve as wing support brackets. In lieu of nuts on the shafts to hold wing support brackets, clamps may be attached to the vertical shafts to set the position of the wing support brackets. Multiple wing support brackets may be positioned on a single shaft. These improvements allow wings of different heights, for instance from different manufacturers 35, 36, 37, to be held on the same display structure. They further allow groupings of wings by type (e.g., type of floor), subtype (e.g., material), color, manufacturer, etc., as exemplified in FIG. 3.

Figure 13:
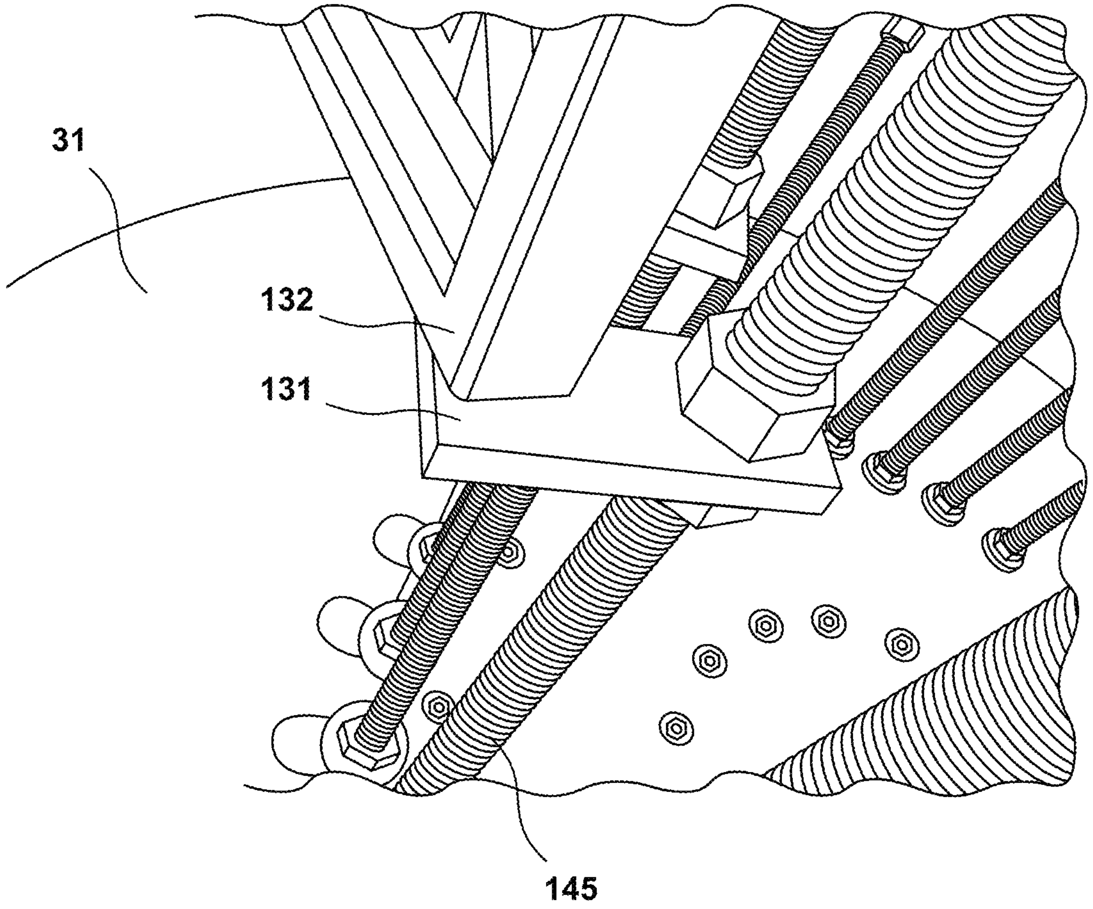
FIG. 13 is a perspective view of a small display wing support bracket sized to hold a single wing or display board.

FIG. 13 is a perspective view of a small display wing support bracket 131 sized to hold a single wing or display board 132. The support bracket 131 may either have a notch or hole that receives vertical shaft 145. The wing or display board 132 may pivot on support bracket 131, either by virtue of hole in support bracket 131 that receives a peg extending from display board 132, or a peg in support bracket 131 that is inserted into a hole in display board 132. Support bracket 131 is positioned at a desired vertical location on vertical shaft 145 and is held in place by washers and nuts above and below the bracket.

Figure 4:
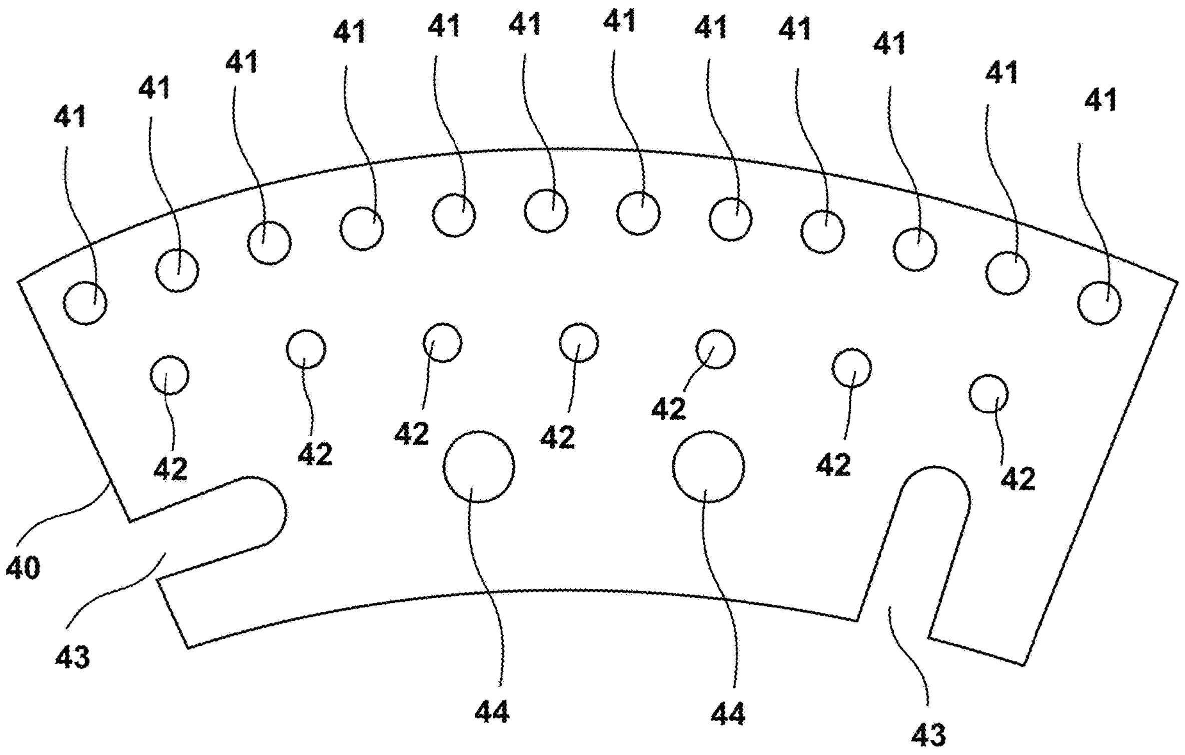
FIG. 4 shows a display wing support bracket having holes or notches to attach it to vertical shafts at a desired height, and, a variety of holes or pegs to receive pivotable display wings.

As shown in FIG. 4, To facilitate positioning the wing support brackets on the shafts, the brackets have holes 44 or notches 45 that engage the vertical shafts. If holes 44 are used, they need to be placed over the shafts as the display system is being constructed. Thus, it is preferable to use notches 45 instead. Notches 45 allow the wing support bracket to be mounted on the vertical shafts after the display system has been constructed; i.e., after the vertical shafts are mounted to the bottom support base and the top support. FIG. 4 shows a top view of such a wing support bracket 40 that has both notches 43 and holes 44. Regardless of which option is used, wing support bracket 40 may be securely mounted to vertical shafts at a desired height by nuts and bolts positioned immediately above and below the wing support bracket 40.

In the display system shown in FIG. 3, the notched display support brackets as shown in FIG. 4 are used. The display support bracket shown in FIG. 4 has an outer row of holes 41 and an inner row of holes 42. Each of these holes can hold a display wing. A retailer may choose to use the holes 41 in an outer row for displays that are not deep (or wide), and holes 42 in an inner row for displays that are deeper. For example, in FIG. 3, the displays 301 are not as deep as the displays 302. This selection allows the outer edges 303 and 304 of the display wings to be closer together.

Figure 5:
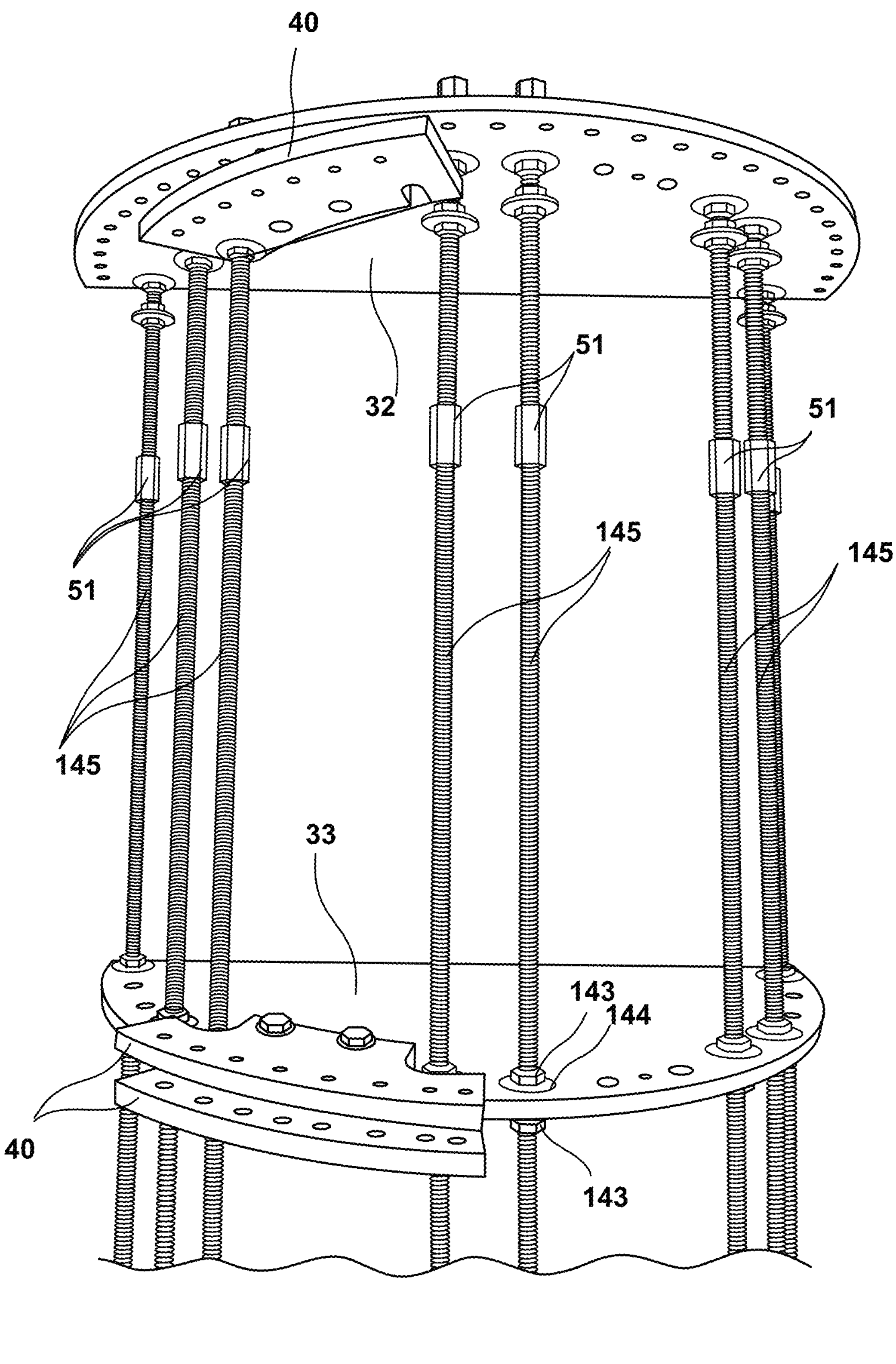
FIG. 5 shows the top and central support structures of a semi-circular display system, and how display wing support brackets may be mounted on either vertical shafts or the central support structure.

FIG. 5 shows a display system with the display wings removed, to shown how the wing support brackets may be mounted on the vertical shafts at various places.

Figure 6:
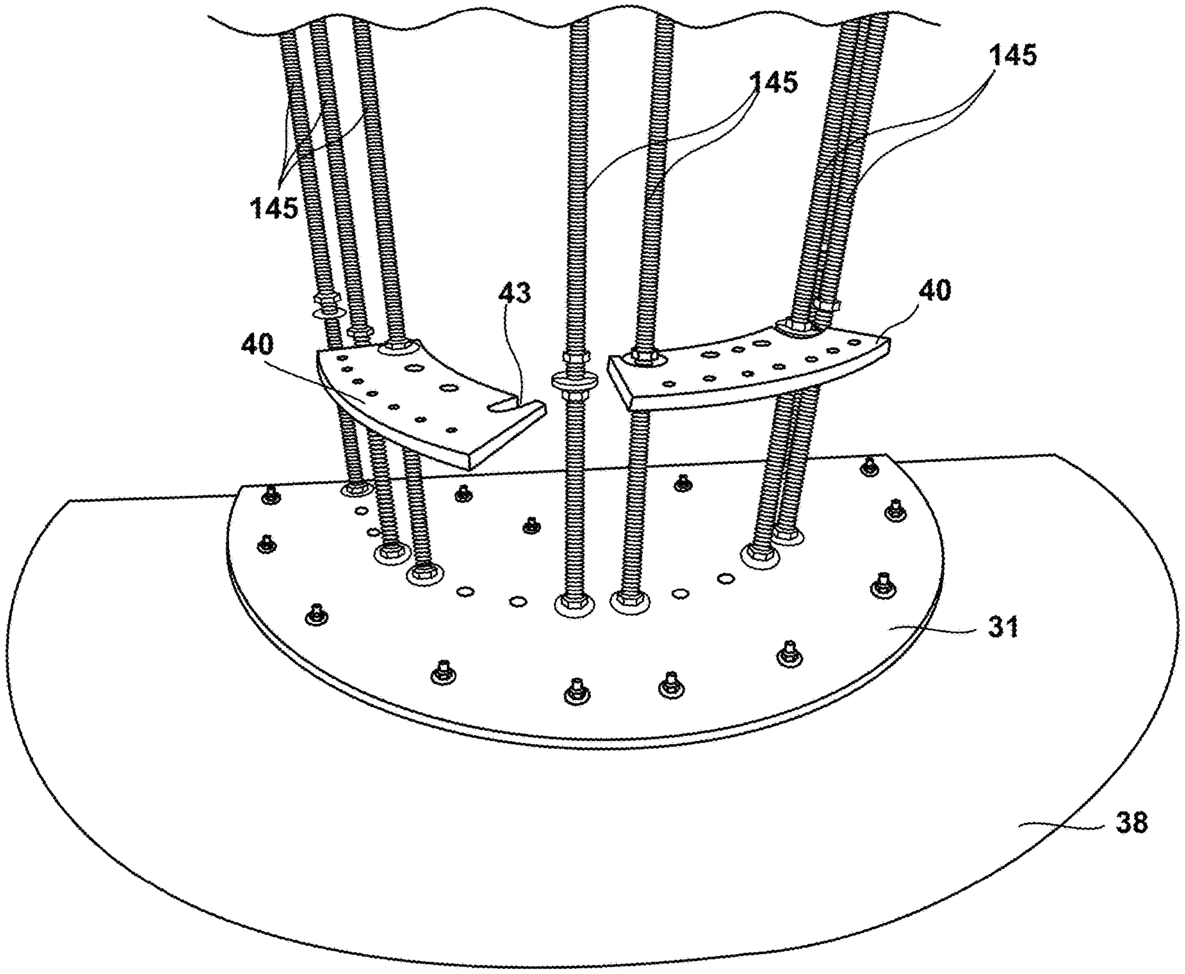
FIG. 6 shows the lower part of a semi-circular display system, and how notches in display wing support brackets may be mounted on or removed from vertical shafts.

FIG. 6 is another view showing how a wing support bracket having a notch as shown in FIG. 6 may be pivoted to abut the vertical shafts, then secured in place using nuts on washers mounted on the vertical shafts.

Display wings from some manufacturers have a peg that extends downward from the lower back of the display to fit into a hole in the display system, and/or a peg that extends upward from the upper back of the display to fit into a hole in the display system. Display systems from other manufacturers have a displays with holes at the bottom and top of the back that receive pegs extending from the display system. Both configurations allow the display to pivot along its back edge so a consumer may view both sides of a selected display. The present system permits either system to be used. As shown in FIGS. 4 and 6, the wing support brackets are provided with holes sized to receive pegs from display wings that have pegs. If a display wing instead has holes, the equivalent of a peg may be formed in the display support bracket by bolting a short threaded bolt to one of the holes in the in wing support bracket.

Figure 7:
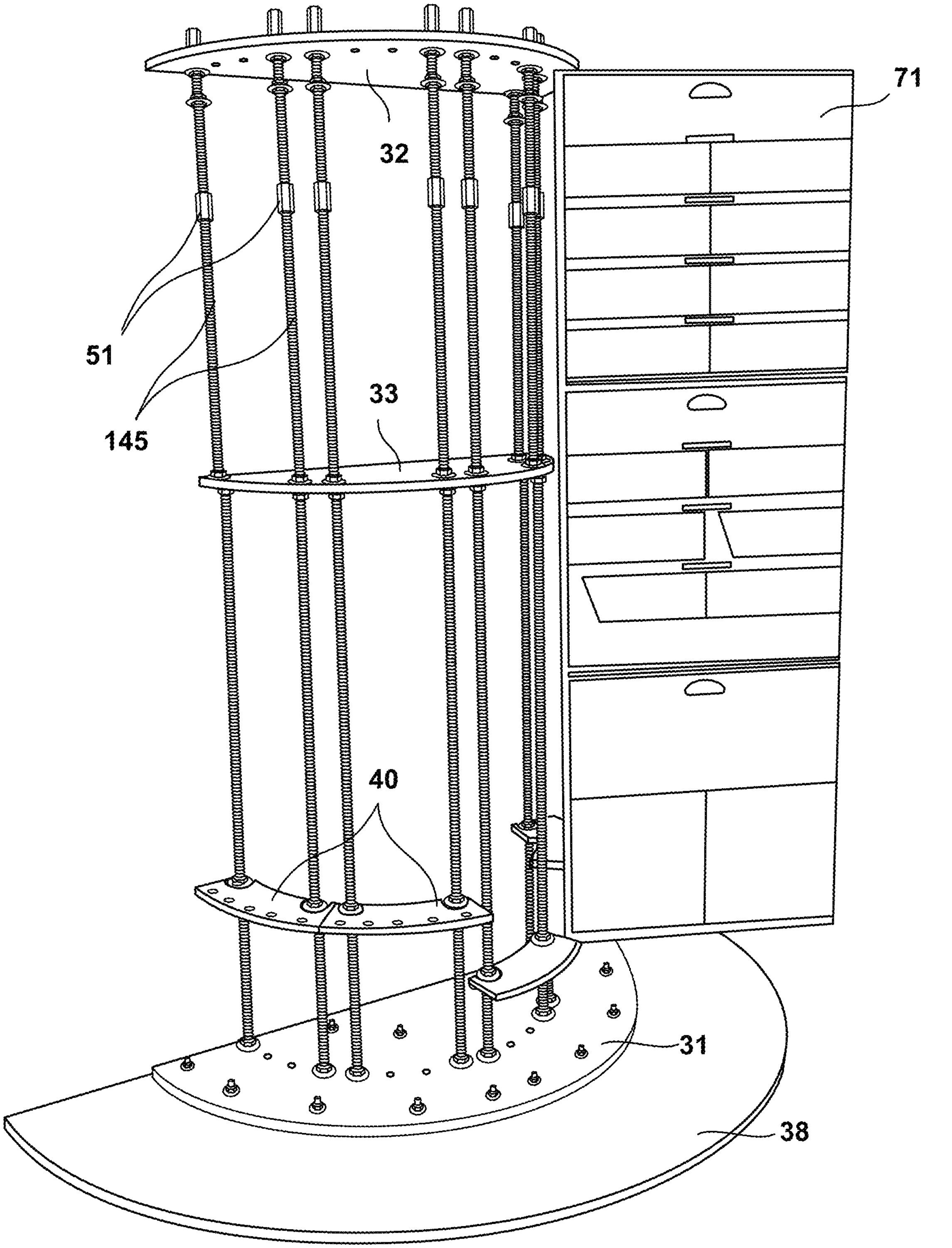
FIG. 7 a partially populated display system in which a tall wing is held by a wing support bracket at one height, and how other wing support brackets may be positioned at different heights.

FIG. 7 shows another embodiment of a display system. In this version a display support bracket holds the bottom of a display wing, and the top of the display wing is held by the top support. Other display wing brackets are mounted on the threaded shafts and can be at different heights to accommodate display wings of different heights.

Sample display wings from manufacturers typically include a board, and a structure for mounting the board to the display system. Structures for mounting may include a channel along the back edge of the board that has receives pegs extending from a display, or pegs extending from the top and bottom of the board that fit into holes in a display. Moreover, boards from different manufacturers may be of different widths. The different types and sizes of structures used by different providers of the boards, and the different thicknesses of the boards, complicate the ability to provide a display that can hold boards of any manufacturer. Presently disclosed is a clamp system designed to hold display boards from any manufacturer, including boards of different thicknesses.

Figure 8:
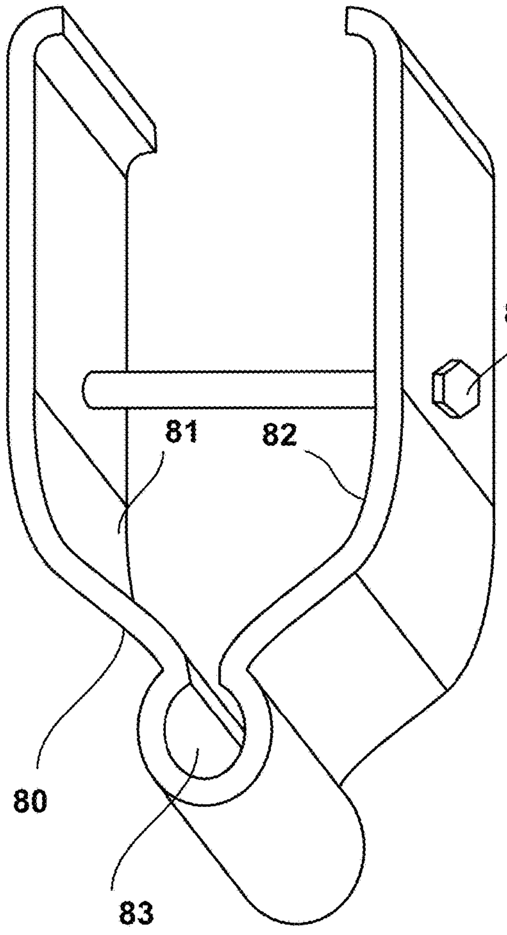
FIG. 8 is a perspective view of clamp for holding a wing or display board having a channel for mounting onto a peg.
Figure 9:
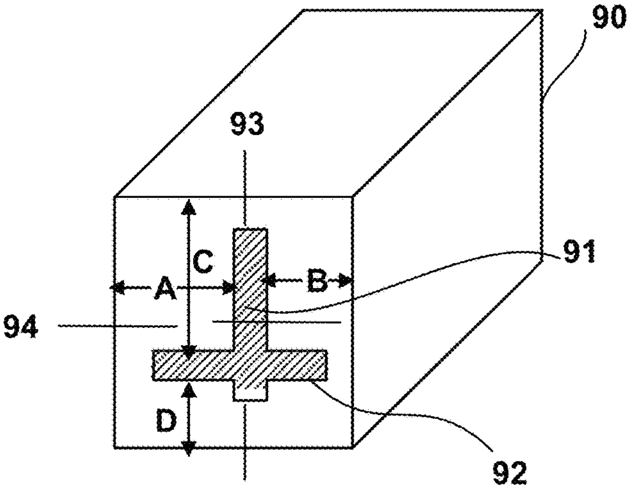
FIG. 9 is perspective view a compressive block have two perpendicular slots that are each offset from the midline of the block by a different amount. The slots may be fitted over the arms of the clamp in FIG. 8.

FIG. 8 is a perspective view of a clamp 80 having left and right arms, 81, 82 each of which has a first end and a second end which are joined at channel 83. This allows the arms to flex toward each other. Clamp 80 also includes a tightening mechanism such as threaded bolt 84 which may be tightened to compress arms 81, 82 toward each other. The clamp system also includes two compressible blocks as shown in FIG. 9. Each block 90, which may be comprised of rubber, has two perpendicular slots, 91 and 92, each of which is sized to accommodate an arm 81, 82 of clamp 80. The slots extend from the front side of the block to the back side. Significantly, the slots may have distances from their parallel sides that are different, in other words, they are offset from the midlines 93, 94 of the block. Thus, by selecting the orientation of the block when placing it over an arm 81 or 82 of clamp 80, it is possible to select the size of the gap between the blocks.

As shown in FIG. 9, vertical slot 91 is slightly offset (to the right) of vertical midline 93, and horizontal slot 92 is offset (below) horizontal midline 94. For example, the distance A between the left side of the block and the vertical slot may be ½ inch, and the distance B between the vertical slot and the right side of the block may ⅜ inch. Similarly, the distance C between the top of block and horizontal slot 92 may be ⅝ inch, and the distance D between horizontal slot 92 and the bottom of the block may be ¼ inch. In one embodiment, the inside distance between clamp arms 81 and 82 may be 1⅜ inch. Thus, by selecting which slot of the block to use and which side will be inside the clamp arms, the gap between the insides of the block may be any where from ⅛ inch to ⅞ inch.

Figure 10:
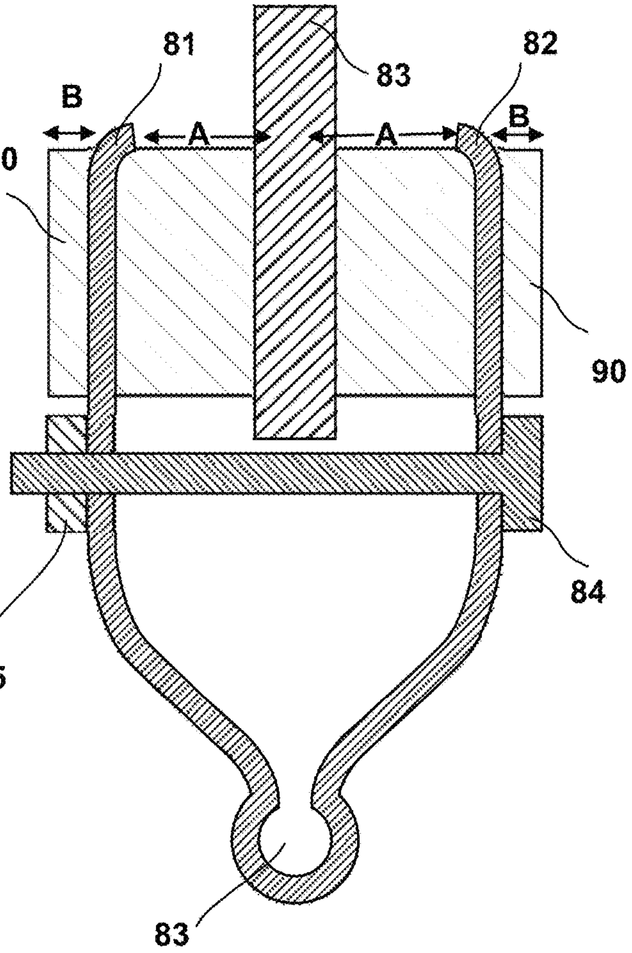
FIG. 10 is a top cross sectional view of a clamp of FIG. 8 having mounted on each arm a block as shown in FIG. 9 to hold thin display board.
Figure 11:
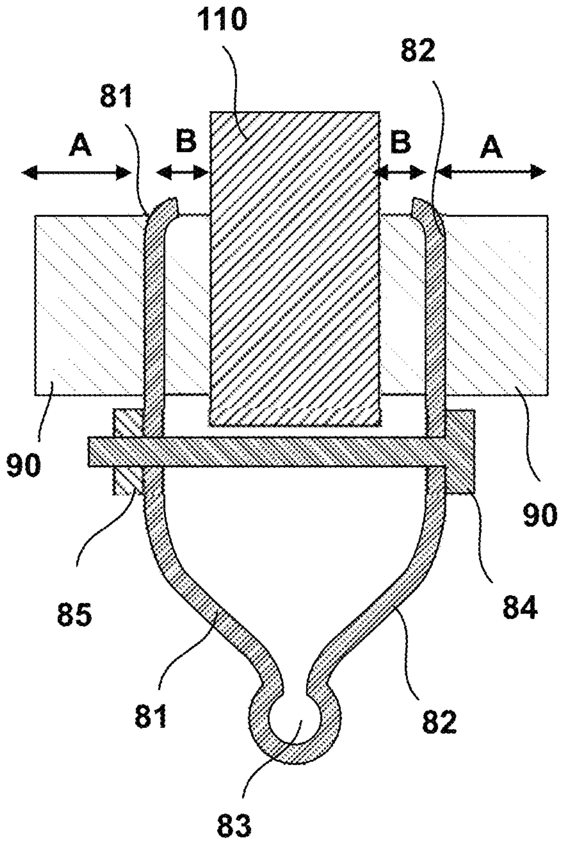
FIG. 11 is a top cross sectional view of a clamp of FIG. 8 having mounted on each arm a block as shown in FIG. 9 to hold thick display board.

These variations are shown, for example, in FIGS. 10 and 11 which are top cross section views of clamp 80 having a block on each arm 81 and 82. In FIG. 10, blocks are positioned so that a ½ inch portion of each block is between the clamp arms, and a ⅜ inch portion is on the outer side of each clamp arm. This allows the clamp to securely hold a board 83 that is ⅜ inch thick. In FIG. 11, blocks are positioned so that a ⅜ inch portion of each block is between the clamp arms, and a ½ inch portion is on the outer side of each clamp arm. This allows the clamp to securely hold a board 110 that is ⅝ inch thick.

Figure 12:
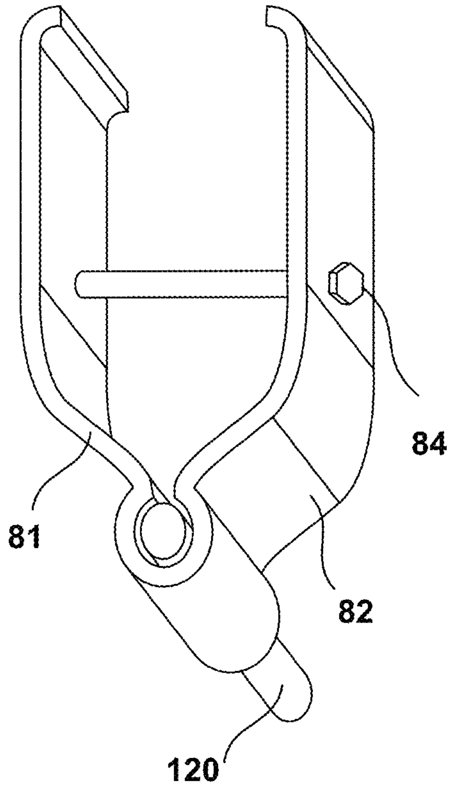
FIG. 12 is a perspective view of clamp for holding a wing or display board having a peg mounting onto a hole in a support bracket.

Blocks are preferably comprised slightly compressive material such as rubber or nylon. By tightening bolt 84 after the blocks are mounted on the arms and the board is positioned between them, the display board is securely held by the clamp and may be mounted in the display system. In the clamp version shown in FIGS. 8, 10 and 11, channel 83 may be inserted into a peg extending from the display system to allow the board to pivot about the peg. Alternatively, as shown in FIG. 12, in lieu of channel 83, the clamp may comprise a peg 120 sized to fit into a mating hole in the display system to hold the board.

Another aspect of the present invention is a system that biases the display wings toward a neutral position. A display structure, not necessarily in a curved configuration, holding multiple pivotable wings may be made whereby each wing is positionable in a neutral position in which the wing does not abut or contact any adjacent wing. The structure would further include a means biasing each wing toward its neutral position. This permits easier viewing of a portion of each wing because adjacent wings are not abutting, which allows viewing of each wing. It also reduces the amount of force required to fully open and display a desired wing when all wings are in their neutral position because adjacent wings will not need to be moved as a user begins to move the desired wing to a displayed position.

Figure 14:
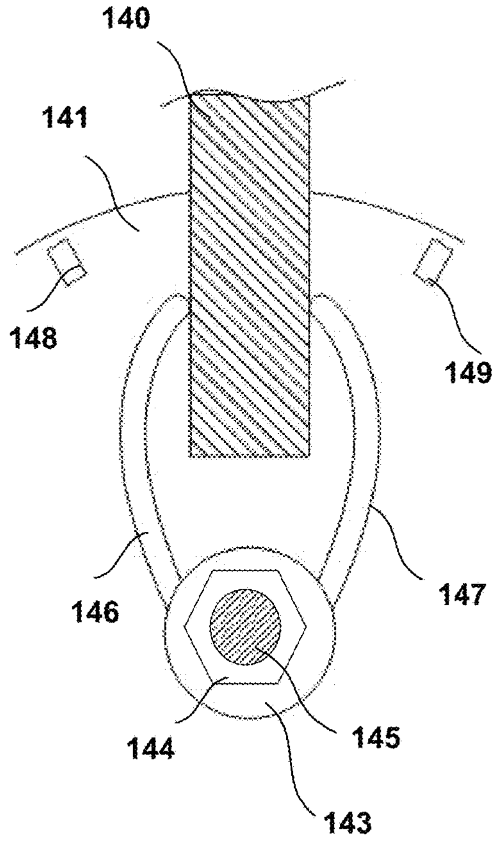
FIG. 14 is a partial top cross-section view of the bottom part of a display wing mounted on display wing support bracket with two spring arms that bias display wing toward a neutral position.
Figure 15:
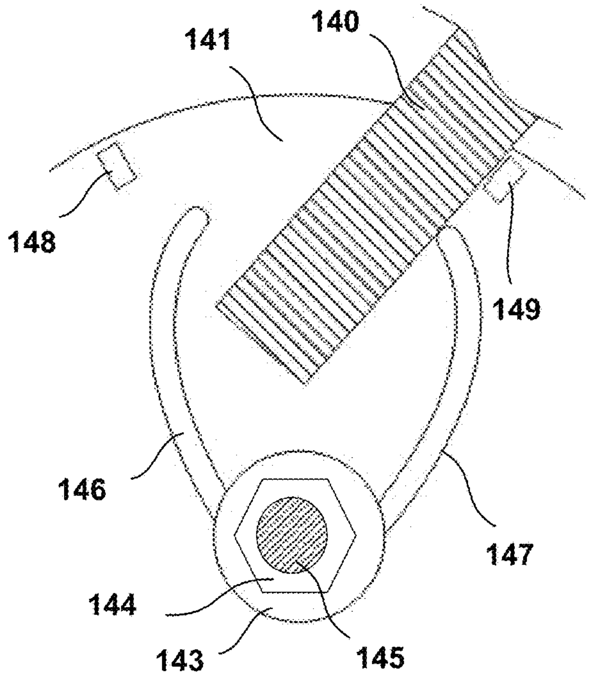
FIG. 15 is a partial top cross-section view of the bottom part of a display wing mounted on display wing support bracket with two spring arms, in which the wing is pivoted to a non-neutral position and held by a magnet mounted on the bracket, and in which the magnet also acts as a stop.

One option for a spring system used to bias each display frame towards a neutral position is shown in FIGS. 14 and 15. FIG. 14 is a partial top cross-section view of the bottom part of a display wing 140 mounted on display wing support bracket or surface 141. Washer 143 and nut 144 hold the bracket or surface at a selected vertical position on threaded shaft 145. As shown in FIG. 14, the washer and nut also hold a spring having two arms 146 and 147 which bias display wing 140 towards a neutral position, such as extending radially outward from the center of the display system. A consumer may pivot a display wing to one side to view it as shown in FIG. 15. In this instance, one of the arms 147 is deflected in the direction of the movement. The position of the display wing can be held in this position by means such as a magnet as described below. When the display wing moved from this open position toward the neutral position shown in FIG. 14, arm 147 of spring will return the display wing 140 to its neutral position.

The display wing support bracket or surface 141 may also be provided with left magnet 148 and right magnet 149, which also act as stops that limit the extent to which the display wing 140 may be pivoted from its neutral position. When display wing 140 is pivoted to the position shown in FIG. 15, right magnet limits the pivoting and also holds the display wing 140 in the pivoted position by magnetic force. When the consumer is finished viewing the display wing, he or she simply slightly pushes it toward the neutral position with enough force to overcome the magnet force, and the spring arms 146 or 147 will return the display wing to the neutral position. Spring arms 146 and 147 may be comprised of any suitable material that is flexible yet maintains consistent shape, such stainless steel.

Another option is using a small detent in the wing support bracket with a small bulb on the wing frame that fits within the detent and is removable with a small amount of force.

When the vertical shafts are positioned in a non-linear or curved configuration, the viewing area of the wings is greater than in the prior art. As shown in FIG. 3, the adjacent wing frames/display boards 35, 36, 37 are able to open to an angle of approximately 150° if so desired. However, it may also be desired to have wing stops that limit the extent to which the wing frames may open. This would be helpful if multiple customers were looking at the same display at the same time in different sections. Therefore, the neighboring wings would not be collapsed on one another making it more difficult to view the desired wing.

FIG. 3 shows a display system including a round base plate 38 and round inner support plate 31. These may be a full or partial oval or circle with the base and support rings being full or cut to allow reconfiguration as desired to full, half, or quarter barrel configurations. The ability to use partial oval or circle base and support rings allows the display system to be positioned around and/or adjacent to a building support column to support the display structure. Connecting the display frame to an existing support column increases the stability and allows the product to have a lighter and smaller base as the column will be able to absorb some of the weight and/or force of the display.

Figure 16:
FIG. 16 shows a representative display board having a QR code.
Figure 17:
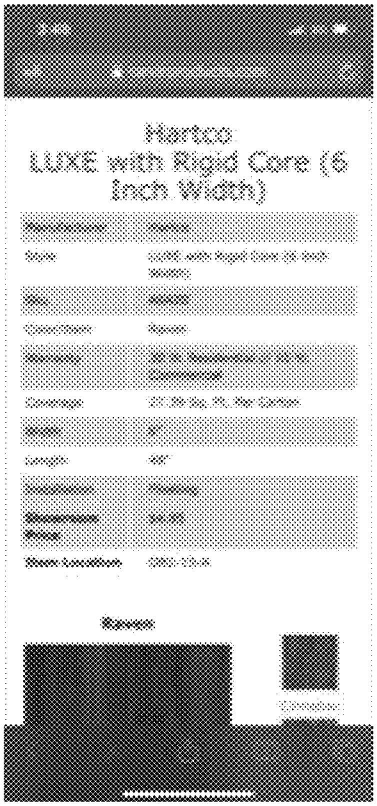
FIG. 17 is a first exemplar of the information displayed using the QR code, hardware, and software system.
Figure 18:
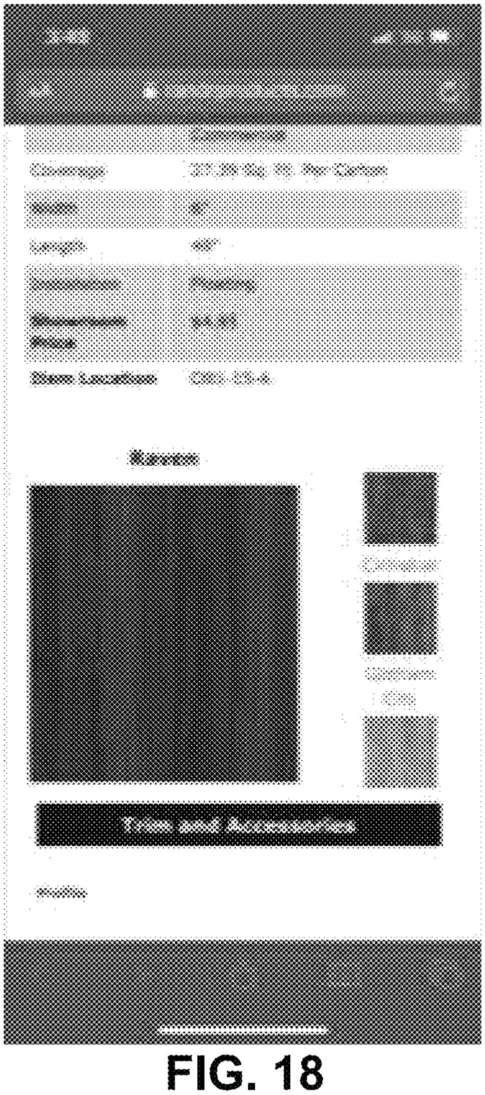
FIG. 18 is a second exemplar of the information displayed using the QR code, hardware, and software system.

The display boards may also bear a sticker having a QR code, barrel identifiers, wing identifiers, and sample identifiers as shown in FIG. 16. When a customer scans the QR code using a QR code reader, like a smartphone, the hardware will connect with the software and provide related information to the customer as shown in FIGS. 17 and 18. That information can include price, availability status, backorder status, discontinued status, and similar products amongst any other information programmed into the database that communicates with the software. A customer may also receive a quote or place an order through a webpage or app displayed in response scanning the QR code.

The QR system may also include a database having identifiers for multiple store locations. One embodiment of the system further includes a means for receiving geolocation information from the hardware used to input quoting or ordering information and a means for quoting pricing information based on the received geolocation information. Once a QR code is scanned, the seller or dealer may also receive information about the customer, such as which codes they have scanned and therefore which types of flooring they may be interested in.

Other options for allowing the wing frame to be held open at a stopping point include a small detent in the wing support bracket with a corresponding notch on the wing frame, similarly corresponding Velcro pieces, or any other suitable means that would allow for stopping and releasing the wing frame with minimal force.

While the invention has been illustrated and described in detail in the foregoing drawings and description, the same is to be considered as illustrative and not restrictive in character, it being understood that only illustrative embodiments thereof have been show and described and that all changes and modifications that are within the scope of the following claims are desired to be protected.

All references cited in this specification are incorporated herein by reference to the extent that they supplement, explain, provide a background for or teach methodology or techniques employed herein.

What is claimed is:

1. A display system for product display wings with height-adjustable wing support brackets comprising:
- a base;
- a display structure holding multiple vertical shafts, each vertical shaft having a lower end terminating in the base;
- each vertical shaft having a wing support bracket that may be positioned at selected vertical locations on one or more of the shafts.

2. The display system of claim 1 wherein:
- the wing support brackets are positionable to hold:
  - the bottom of a product display wing;
  - the top of a product display wing; or
  - both the bottom and top of a product display wing.

3. The display system of claim 1 wherein:
- the wing support brackets are vertically adjustable via:
  - a threaded nuts on the vertical shafts; or
  - a clamp.

4. The display system of claim 1 further comprising multiple wing support brackets on one or more of the vertical shafts.

5. The display system of claim 1 wherein at least one of the wing support brackets comprises an outer edge, an inner edge and first and second side edges, the inner edge comprising a first notch and one of the side edges comprising a notch.

6. A method of displaying product display wings of different heights comprising:
- providing a product display system of claim 1,
- positioning a first wing support bracket on a first vertical shaft at a desired height, positioning a second wing support bracket on a second vertical shaft at a desired height that is different from the height of the first wing support bracket; and positioning a first display wing in the first wing support bracket; and positioning a second display wing in the second support bracket.

7. The method of claim 6 further comprising the steps of:

displaying a QR Code adjacent the first wing;

scanning the QR code; and providing information about the product displayed in the first wing.

8. A product display system for holding multiple product display wings comprising:

a frame holding multiple vertical shafts, the multiple vertical shafts being non-coaxial and horizontally adjacent to each other, a plurality of wing support brackets, each wing support bracket comprising means for mounting the bracket on at least one of the vertical shafts means for holding a plurality of product display wings means for holding each wing support brackets at a selected height on at least one of the vertical shafts.

9. The product display system of claim 8 wherein:

each wing support bracket comprises at least one notch sized to partially surround at least one of the shafts;

and the means for holding a plurality of product display wings comprises a plurality of holes in the bracket sized to receive product display wings.

10. The product display system of claim 9 wherein:

each the adjustable wing support comprises an outer edge, an inner edge and first and second side edges, the inner edge comprising a first notch and one of the side edges comprising a notch.

11. The product display system of claim 8 wherein the adjustable wing support brackets hold the tops of display wings.

12. The product display system of claim 8 wherein the adjustable wing support brackets hold the bottoms of display wings.

13. The product display system of claim 8 wherein the shafts are threaded, and the vertical position of the adjustable wing support bracket on each shaft is adjustable by rotating a nut on the shaft.

14. The product display system of claim 8 wherein the vertical shafts are configured in an arc.

15. The product display system of claim 8 further comprising a base, a top and an intermediate support structure.

16. The product display system of claim 15 wherein each shaft is secured to the base, the top and the intermediate support structure.

17. The product display system of claim 15 wherein the intermediate support structure further comprises holes for holding a display wing.

18. A method of displaying product display wings of different heights comprising:

providing a product display system of claim 8, positioning a first wing support bracket on a first vertical shaft at a desired height, positioning a second wing support bracket on a second vertical shaft at a desired height that is different from the height of the first wing support bracket; and positioning a first display wing in the first wing support bracket; and positioning a second display wing in the second support bracket.

19. The method of claim 18 further comprising the steps of:

displaying a QR Code adjacent the first wing;

scanning the QR code; and providing information about the product displayed in the first wing.

20. A building product sample display comprising:

a base, a top and an intermediate support a plurality of vertical shafts having upper and lower ends, each lower end connected to the base, and each upper end connected to the top, and the intermediate support structurally engaging the shafts;

a plurality of product display wing brackets;

a plurality of display wings supported by the display wing support surfaces;

wherein the vertical shafts are arranged in a vertically arcuate orientation.

21. The building product display system of claim 20 wherein at least some of the display wing supports surfaces are in either the base or the top.

22. The building product display system of claim 20 wherein some of the product display wings have a first height, and some of the product display wings have a second height that is different from the first height.

23. The building product display system of claim 20 wherein at least some of the display wing support surfaces project from and are secured to at least some of the vertical shafts.

* * * * *